United States Patent
Sheff et al.

(10) Patent No.: US 11,040,752 B2
(45) Date of Patent: Jun. 22, 2021

(54) ERGONOMIC BICYCLE HANDLEBAR SYSTEMS

(71) Applicants: Don Sheff, Redwood City, CA (US); Rick Sutton, Salinas, CA (US); Damon Campbell, Pacific Grove, CA (US)

(72) Inventors: Don Sheff, Redwood City, CA (US); Rick Sutton, Salinas, CA (US); Damon Campbell, Pacific Grove, CA (US)

(73) Assignee: CoEfficient Cycling LLC, Redwood City, CA (US)

( * ) Notice: Subject to any disclaimer, the term of this patent is extended or adjusted under 35 U.S.C. 154(b) by 0 days.

(21) Appl. No.: 16/548,703

(22) Filed: Aug. 22, 2019

(65) Prior Publication Data

US 2019/0375478 A1 Dec. 12, 2019

Related U.S. Application Data

(63) Continuation-in-part of application No. 16/024,508, filed on Jun. 29, 2018, now Pat. No. 10,392,073, which is a continuation-in-part of application No. 15/097,374, filed on Apr. 13, 2016, now abandoned.

(51) Int. Cl.
*B62K 21/12* (2006.01)

(52) U.S. Cl.
CPC .................... *B62K 21/12* (2013.01)

(58) Field of Classification Search
CPC ..................... B62K 21/12; Y10T 74/2078
See application file for complete search history.

(56) References Cited

U.S. PATENT DOCUMENTS

| D222,019 S | * | 9/1971 | Carlton | D12/178 |
| 4,503,729 A | * | 3/1985 | Shimano | B62K 21/12 74/551.1 |
| 4,829,847 A | | 5/1989 | Modolo | |
| 5,024,119 A | | 6/1991 | Linden | |
| 5,083,476 A | | 1/1992 | Borromeo | |
| 5,390,564 A | | 2/1995 | Klicher | |
| 5,660,085 A | | 8/1997 | Tamplin | |
| D727,132 S | * | 4/2015 | D'Aluisio | D8/303 |
| 9,862,450 B2 | * | 1/2018 | Meggiolan | B62K 21/12 |
| D844,513 S | * | 4/2019 | Izaz | D12/178 |
| 2004/0045132 A1 | * | 3/2004 | Chen | B62K 21/12 16/430 |
| 2004/0244526 A1 | | 12/2004 | Jones | |
| 2007/0065784 A1 | | 3/2007 | Nix | |
| 2016/0353724 A1 | | 12/2016 | Miller et al. | |

FOREIGN PATENT DOCUMENTS

DE 9311072 U1 * 10/1993 ............. B62K 21/12

\* cited by examiner

*Primary Examiner* — Thomas C Diaz
(74) *Attorney, Agent, or Firm* — James E. Eakin

(57) ABSTRACT

A bicycle handlebar system that ensures comfort, safety, and increased center of gravity control. An ergonomic bicycle handlebar system having a sweep angle in the range of 4 to 45 degrees, a slope angle in the range of 5 to 60 degrees or both accomplishes comfort, safety, and increased center of gravity control. The handlebar may be made of nano tube zlyte resin with graphene-impregnated carbon fibers. The interplay of sweep angle and slope angle is recognized.

20 Claims, 5 Drawing Sheets

ERGONOMIC BICYCLE HANDLEBAR SYSTEMS

CROSS-REFERENCE TO RELATED APPLICATION

The present application is a Continuation-in-Part of and is related to and claims priority to pending U.S. Non-Provisional patent application Ser. No. 16/024,508, filed Jun. 29, 2018, which is a Continuation-in-Part of and is related to and claims priority to abandoned U.S. Non-Provisional patent application Ser. No. 15/097,374, filed Apr. 13, 2016; their full content is incorporated by this reference.

TECHNICAL FIELD

The present invention relates generally to the field of bicycle handlebars.

BACKGROUND

This discussion includes information that may be useful in understanding the present invention. It doesn't admit that any of this information is prior art to, or material to the inventions, or that any publication or document that is specifically or implicitly referenced is prior art.

Cyclists, especially competitive cyclists, look for every advantage they can gain with their equipment. Improper mechanics decreases efficiency, which can cause strain and fatigue. For example, improperly designed handlebars encourage the cyclist into the wrong position. Wrong positioning can increase wind resistance and fatigue the cyclist. The same goes for the cyclist's breathing. Improper arm and shoulder alignment constricts the lungs and prevents them from functioning at full capacity. This puts the racer at a competitive disadvantage. Proper arm and shoulder positioning is also crucial to limit and avoid injury in case of a crash; improper arm and elbow positioning increases the likelihood of injury in the event of a crash.

Bicyclists seek to maximize efficiency while minimizing the risk of injury. Equipment optimization is a vital aspect of this goal. The correct aspects of ergonomic bicycle handlebar systems require proper positioning of the hands which in turn dictates the position of the elbows as well as the shoulders. Proper elbow and shoulder positioning reduces the cyclist's cross-section while positioning the cyclist to reduce the chance of a broken collarbone or rotator cuff. Proper hand and elbow placement reduces lost energy due to "side-to-side" motion while pedaling. What is needed is a bicycle handlebar system that ensures comfort, safety, and control.

Several attempts have been made to solve the above-mentioned problems such as attempts disclosed in U.S. Pub. No. 2004/0244526 to Jones, U.S. Pat. No. 4,829,847 to Modolo, U.S. Pat. No. 5,083,476 to Borromeo, U.S. Pat. No. 5,390,564 to Klicher, U.S. Pat. No. 5,024,119 to Linden, and U.S. Pat. No. 5,660,085 to Tamplin, among others. This art is representative of bicycle handlebars.

Preferably, a bicycle handlebar system should provide a user with comfort, safety, and control, operate reliably, and be economically manufacturable. Thus, a need exists for a reliable ergonomic bicycle handlebar system.

SUMMARY

This disclosure is directed generally to high-performance bicycle handlebars. These handlebars have carefully engineered shape and positioning to maximize ergonomics for the cyclist and to minimize air resistance and injuries when a crash occurs. An invention handlebar has a top bar with a stem clamp area disposed between a first bar and a second bar or a first bar section and a second bar section. Various examples have thumb indexes such as flattened indexes formed into the drop portion of the handlebar.

In some examples, the handlebar has a width and a bar diameter that is proportional to the width.

Various examples of the handlebar have a sweep angle in the range of 4 to 45, 4 to 30 or 4 to 15 degrees. In these or other examples, the handlebars have a slope angle in the range of 5 to 60, 5 to 30 degrees, or 5 to 15 degrees.

In some examples, the sweep angle and the slope angle work synergistically to provide the benefits described above. For example, handlebars with a sweep angle in the range of 4 to 30 degrees combined with a slope angle in the range of 5 to 60 degrees, with a sweep angle in the range of 4 to 30 degrees combined with a slope angle in the range of 5 to 30 degrees, or with a sweep angle in the range of 4 to 30 degrees combined with a slope angle in the range of 5 to 15 degrees provide beneficial high-performance handlebars.

For example, handlebars with a sweep angle in the range of 4 to 15 degrees combined with a slope angle in the range of 5 to 60 degrees, with a sweep angle in the range of 4 to 15 degrees combined with a slope angle in the range of 5 to 30 degrees, or with a sweep angle in the range of 4 to 15 degrees combined with a slope angle in the range of 5 to 15 degrees also provide beneficial, high-performance handlebars.

The present invention holds significant improvements and serves as an ergonomic bicycle handlebar system. Not necessarily all such advantages may be achieved in accordance with any one particular embodiment of the invention. For purposes of summarizing the invention, certain aspects, advantages, and novel features of the invention have been described. Not necessarily all such advantages may be achieved in accordance with any one particular embodiment of the invention. Thus, the invention may be embodied or carried out in a manner that achieves or optimizes one advantage or group of advantages as taught without necessarily achieving other advantages as may be taught or suggested. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The various embodiments of the present invention will be described in conjunction with the appended drawings, wherein like designations denote like elements.

DETAILED DESCRIPTION

Figure 1:
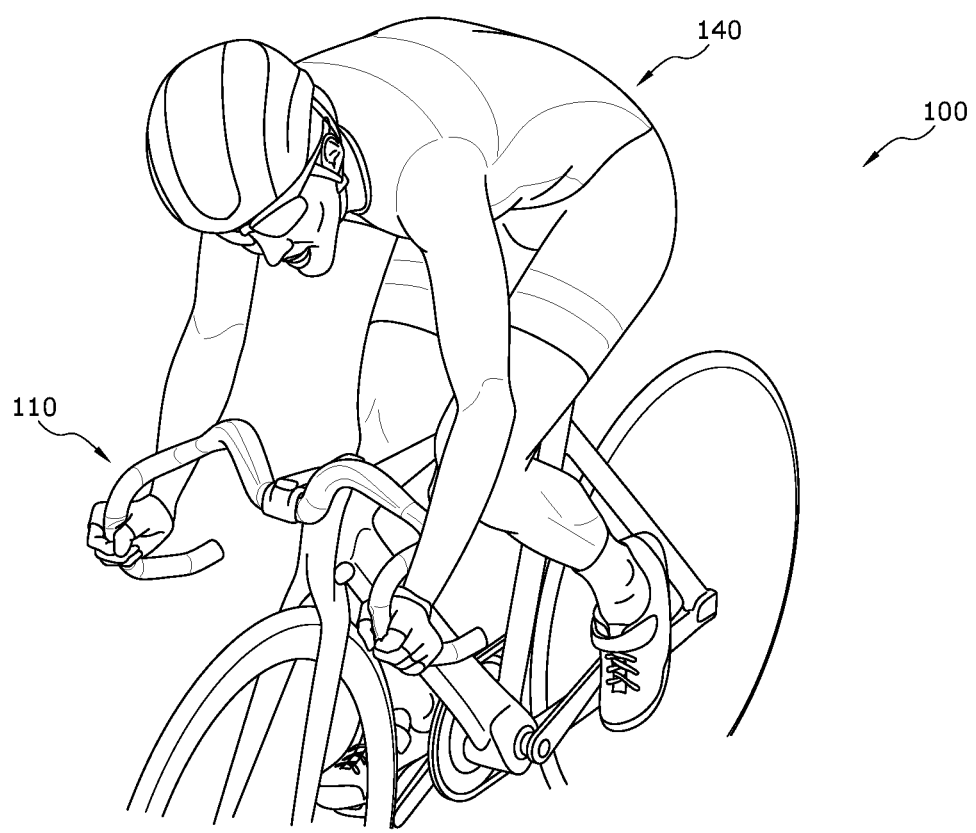
FIG. 1 shows a perspective view illustrating a handlebar system during an 'in-use' condition.

Embodiments of the present invention relate to bicycle handlebar systems and more particularly to a handlebar system useful to improve a cyclist's body and hand position for improving efficiency and safety. An ergonomic bicycle handlebar system may comprise a handlebar as disclosed.

For purposes of this disclosure, "normally oriented" means that the bike is vertical, both wheels touch the ground, and the front wheel points in the same direction as the rear wheel.

One component or portion is "substantially perpendicular" to another component or portion when the angle between the portions is less than 45, 35, 25, or 20 degrees away from perpendicular.

One component or portion is "substantially parallel" to another component or portion when the angle between the portions is less than 45, 35, 25, or 20 degrees away from parallel.

A plane is "substantially horizontal" if it is less than 45, 35, 25, or 20 degrees away from horizontal.

A plane is "substantially vertical" if it is less than 45, 35, 25, or 20 degrees away from vertical.

Flare angle 50 is the angle between an axis 15 substantially perpendicular to the opening of end 51 of handlebar 110 and the sagittal plane 17 of the bike when the bike is normally oriented. Flare angles range from 0-45 degrees, 0-30 degrees, or 0-10 degrees.

Drop angle 52 is the angle between the sagittal plane and a plane containing drop 53 (and flare angle is zero). Drop angles range from 0-90 degrees, 0-45 degrees, or 0-20 degrees.

Slope angle 130 is the angle between grip portion 54 and a substantially ranges from 5 to 60 degrees. An intermediate slope angle ranges from 5 to 30 degrees. A small slope angle ranges from 5 to 15 degrees. In some embodiments, the bottom of the slop angle range is 8-15 degrees or 10-15 degrees.

Sweep angle 123 is the angle between a substantially vertical plane passing through the grip portion 54 and the sagittal plane of the handlebar 124. A large sweep angle ranges from 4 to 45 degrees. An intermediate sweep angle ranges from 4 to 30 degrees. A small sweep angle ranges from 4 to 15 degrees. In some embodiments, the bottom of the slope angle range is 8-15 degrees or 10-15 degrees.

Stem clamp area 55 is the region of handlebar 110 designed to contact the stem. Since this connection controls the orientation of handlebar 110 with respect to the bike, stem clamp area 55 is usually designed to sit substantially horizontally and substantially perpendicularly to the sagittal plane 17 of the bike.

A "clamp axis" is the longitudinal axis 19 of the stem clamp area 55 substantially perpendicular to the sagittal plane 17 of the bike.

In some version, the diameter of the handlebar is proportional to the width of the handlebar. Bicycle handlebars are traditionally sized based on the width of the cyclist's shoulders. Smaller cyclists will generally have narrower shoulders. Smaller cyclists will generally also have smaller hands. Since bars that better match cyclist hand size are more comfortable and, hence, less fatiguing, larger bars have larger diameters and smaller bars have smaller diameters in various embodiments.

Referring to the drawings by numerals of reference, FIGS. 1-4 show a coefficient ergonomic bicycle handlebar or bar 110. FIG. 1 shows a perspective view illustrating coefficient ergonomic bicycle handlebar 110 during an 'in-use' condition.

Figure 2A:
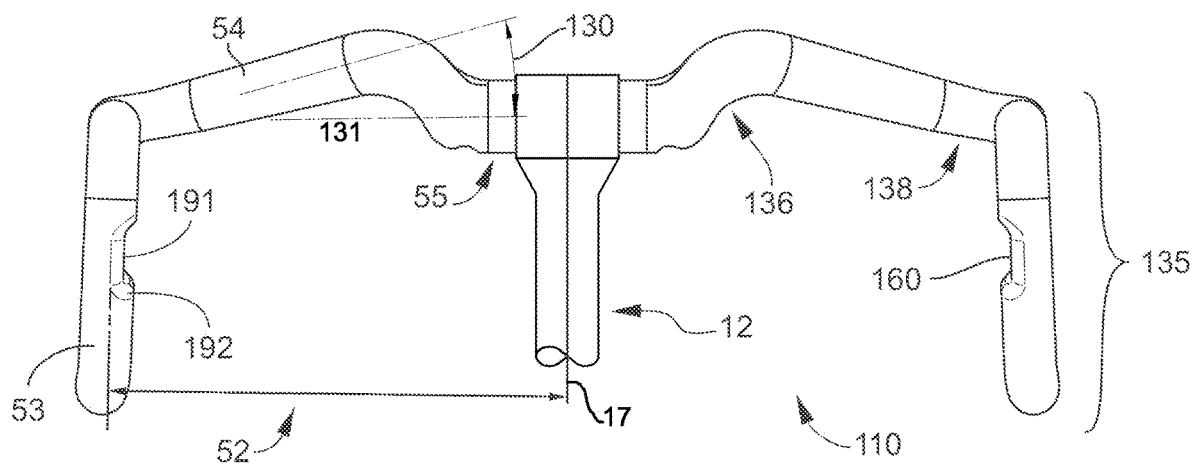
FIG. 2A is a perspective view illustrating the handlebar of FIG. 1.

FIG. 2A shows a perspective view illustrating handlebar 110 looking at the front. The figure shows handlebar 110 mounted in stem 12. Drop 53 and grip area 54 serve as areas that a cyclist can use to grip bar 110. FIG. 2A also depicts drop zone 135 with inner portion 136 and outer portion 138, thumb index 160, and flat palm-steering segment 170. Slope angle 130 is shown, as well. Handlebar 110 may be structured and arranged to provide cyclist 140 with a device for maximizing bicycle riding efficiency and safety.

Figure 2B:
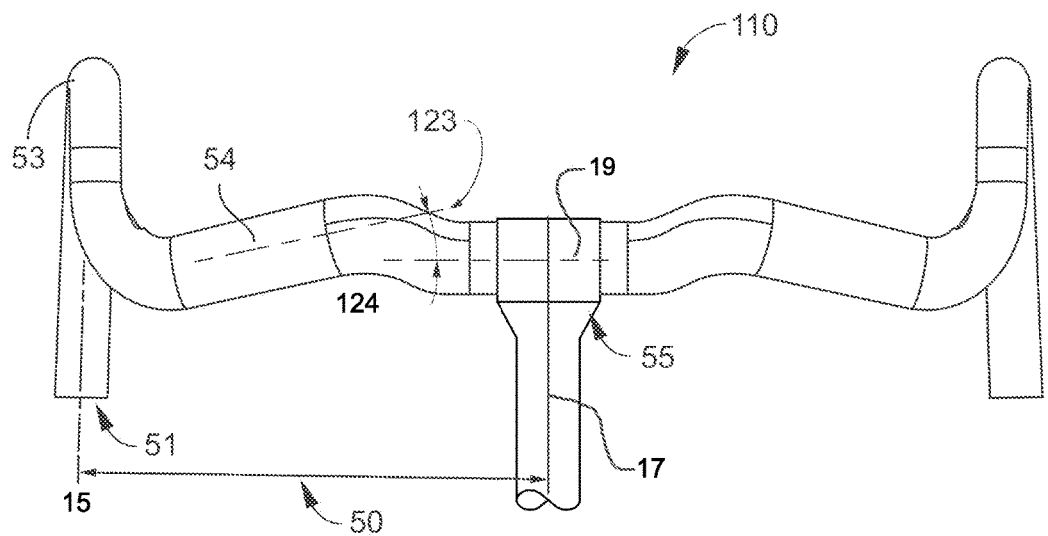
FIG. 2B is a perspective view illustrating the handlebar of FIG. 1.

FIG. 2B shows an overhead perspective view illustrating handlebar 110. The figure shows handlebar 110 and bar end 51. For help in orientation, drop 53 and grip area 54 are also called out in this figure. Sweep angle 123 is shown, as well. Handlebar 110 may be structured and arranged to provide cyclist 140 with a device for maximizing bicycle riding efficiency and safety.

Sweep angle 123 and slope angle 130 are independently adjustable to provide better cyclist positioning. But in some embodiments, sweep angle 123 and slope angle 130 work together in handlebar 110 synergistically to create desired ergonomics or positioning and to place the cyclist's center of gravity properly with respect to the bike—positioning not accessible without optimizing sweep angle 123 and slope angle 130 together.

Figure 3A:
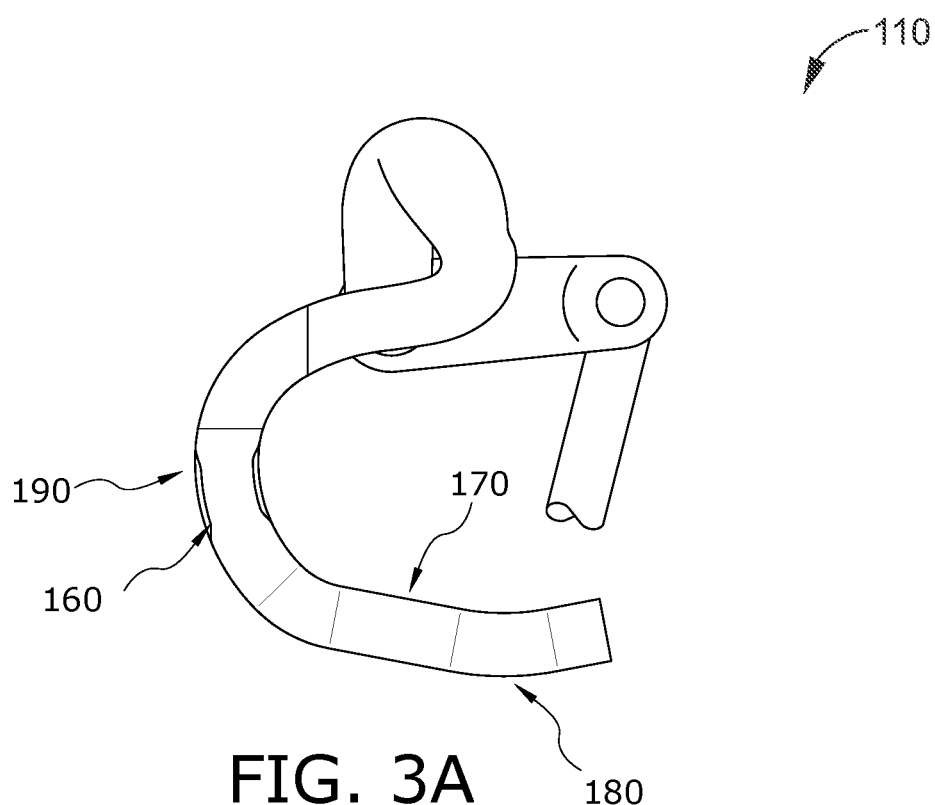
FIG. 3A is a perspective view illustrating the handlebar of FIGS. 1-2B.
Figure 3B:
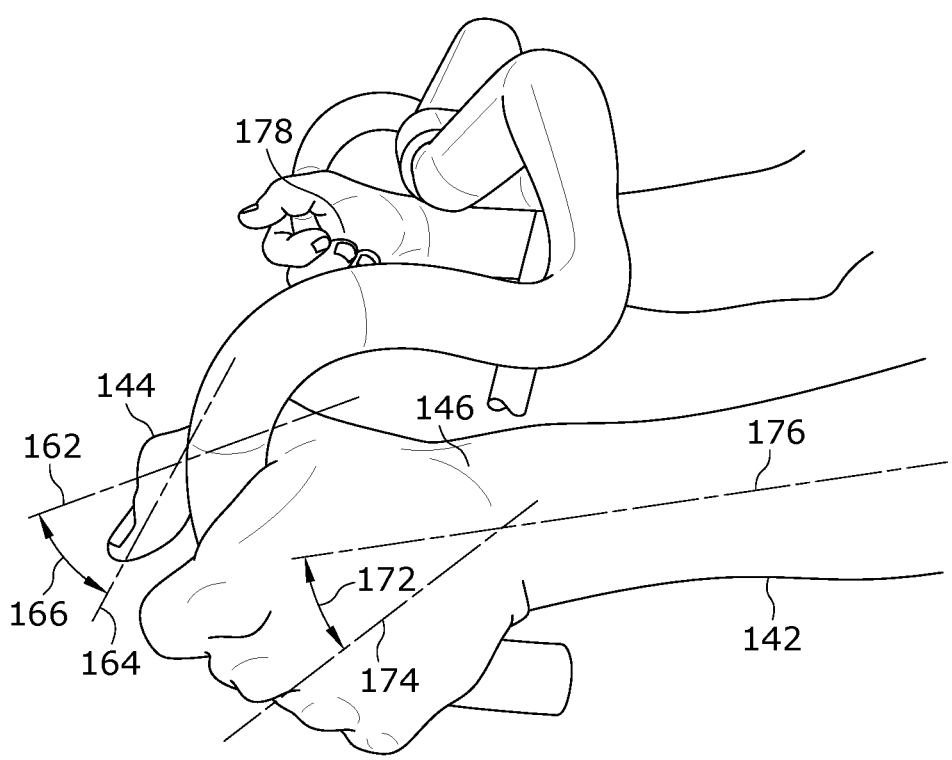
FIG. 3B is another perspective view illustrating the handlebar of FIGS. 1-2B.

FIG. 3A shows handlebar system 100 in which flat palm-steering segment 170 is 65 mm. Referring now to FIG. 3B, which shows flat palm-steering segment 170 yielding a wrist 146 position in relation to forearm 142 such that palm angle 172 rotates palm 78 10 degrees toward the bike's center of gravity between forearm angle line 176 and wrist angle line 174. Different examples yield different palm rotation angles. Lowest handlebar segment 180 is located adjacent to flat palm-steering segment 170. Vertical handlebar segment 190 is located between flat palm-steering segment 170 and the second portion of drop 138. Thumb index 160 is positioned on vertical handlebar segment 190. Thumb index 160 comprises a longer thumb index dimension 191 and a shorter thumb index dimension 192.

Figure 4:
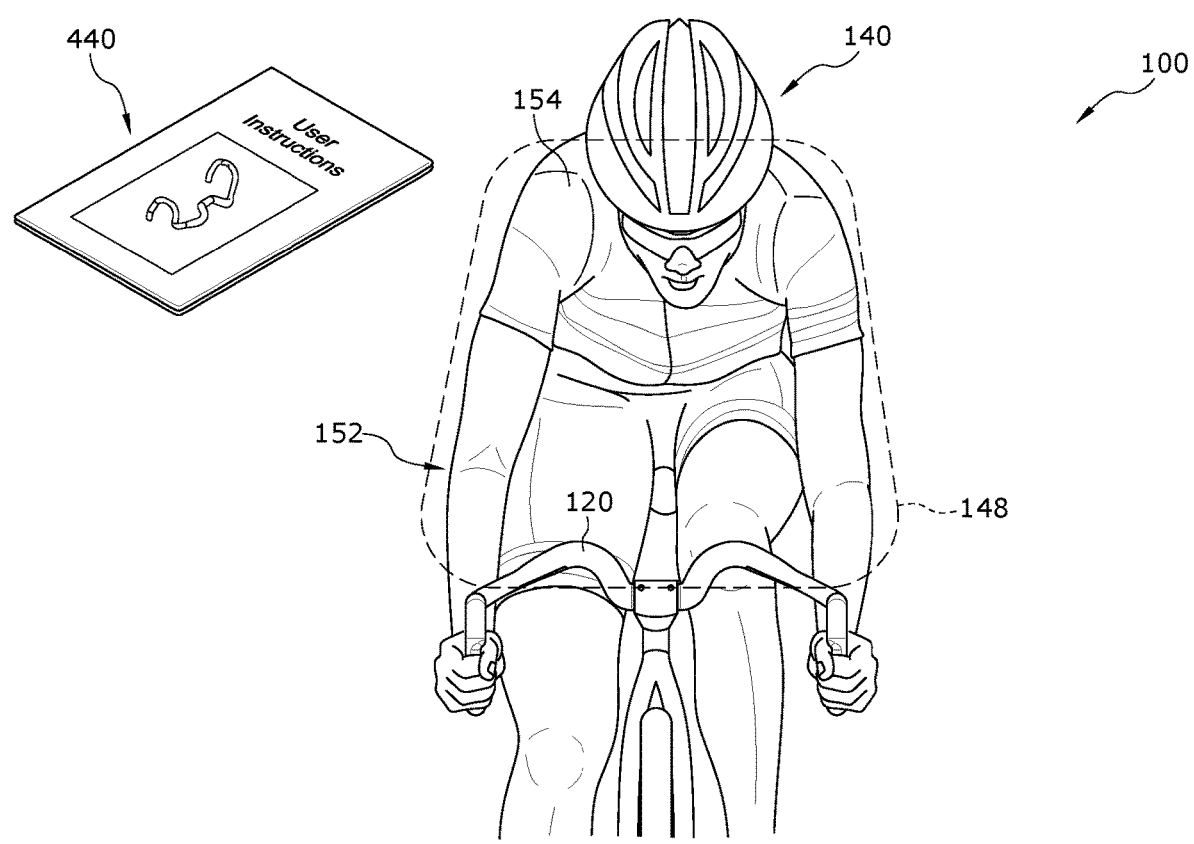
FIG. 4 is a perspective view illustrating the handlebar of FIGS. 1, 2B, 3A, and 3B.

Referring now to FIG. 4, which shows handlebar 110 in which thumb index 160 and flat palm-steering segment 170 work together to achieve the desired center of gravity for the cyclist with respect to the bike. Thumb index 160 of handlebar 110 provides a reference for thumb 144 for properly gripping handlebar 110 resulting in moving elbows 152 inward 3-5 degrees for optimal minimal frontal area and safety. FIG. 4 further illustrates handlebar 110 positioned in relation to the body of cyclist 140 such that thumb index 160 and flat palm-steering segment 170 position the elbows of cyclist 140 to reduce injury through proper elbow 152 alignment should a crash occur. Thumb index 160 is arranged at a period 166 of thumb index line (1) 162 and thumb index line (2) 164 and yields a 3 degree to 5 degree inward rotation of elbows 152. Different examples yield different elbow rotations.

In certain embodiments sweep angle 123 and drop angle 52 may be arranged to satisfactorily position a cyclist's grip to reduce frontal area 148. Proper shoulder 154 and cyclist profile alignment reduces frontal area 148, which reduces wind resistance.

In certain embodiments slope angle 130 and drop angle 52 may be arranged to satisfactorily position a cyclist's grip to also reduce frontal area.

In certain embodiments sweep angle 123, slope angle 130, and drop angle 52 may be arranged to satisfactorily position a cyclist's grip to also reduce frontal area.

Some embodiments of the handlebar system 100 yield an optimal position of a cyclist's grip for improved pedaling efficiency by limiting the amount of energy lost to side-to-side movement outside of a more nominal center of gravity. Also, embodiments of handlebar system 100 may be arranged such that drop angle 52 provides enhanced cyclist efficiency by positioning the shoulders for presenting a minimal frontal area 148. Certain embodiments of the handlebar 110 may have nano tube zlyte resin with Graphene-impregnated carbon fibers. Other materials may be used in alternate embodiments.

Certain embodiments of the handlebar system 100 may be arranged such that the functional combination of sweep angle 123 and drop angle 52 create an optimal camera angle for viewing traffic behind user 140. These embodiments of handlebar system 100 may be arranged such that the functional combination of slope angle 130 and drop angle 52 create an optimal camera angle for viewing road beneath and behind user 140 (cyclist 140).

Handlebar system 100 may be sold as kit 440 comprising a handlebar and instructions. The instructions detail functional relationships of to the structure of the invention (allowing the invention to be used, maintained, or the like in a preferred manner). Handlebar system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different orientations and combinations, parts may be sold separately, etc., may be sufficient.

Figure 5:
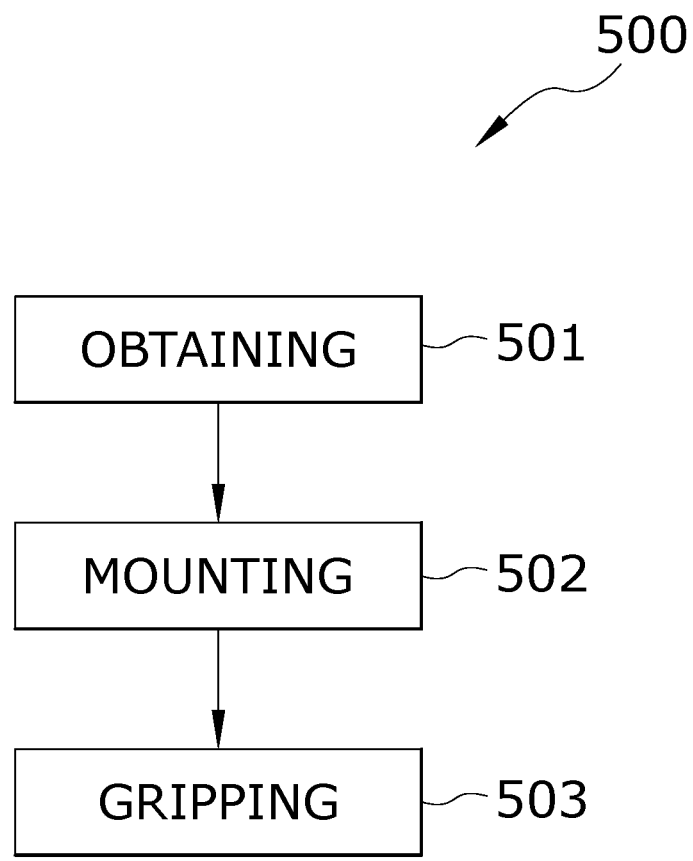
FIG. 5 is a flowchart illustrating a method of use for the handlebar system of FIGS. 1-4.

Referring now to FIG. 5, showing flow chart illustrating method of use 500 for a handlebar system 100 according to an embodiment of the present convention.

As shown, method of use 500 may comprise step 501, obtaining handlebar system 100; step 502, mounting handlebar 110 to a bicycle or stem; and step 503, gripping handlebar 110 for use The steps described in the method of use can be carried out in many different orders according to user preference. The use of "step of" should not be interpreted as "step for", in the claims and is not intended to invoke the provisions of 35 U.S.C. § 12, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

These embodiments of the invention described are exemplary, and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

It should be noted that the steps described in the method of use can be carried out in many different orders according to user preference. The use of "step of" should not be interpreted as "step for", in the claims and is not intended to invoke the provisions of 35 U.S.C. § 12(f). It should also be noted that, under appropriate circumstances, considering such issues as design preference, user preferences, marketing preferences, cost, structural requirements, available materials, technological advances, etc. or other methods.

What is claimed is:

1. A bicycle handlebar comprising:
a stem clamp area having a stem clamp axis, the stem clamp area being fixedly disposed between symmetrical left and right grip portions wherein each of the left and right grip portions comprises an inner grip portion and an outer grip portion,
the left inner grip portion extending upwardly relative to the stem clamp axis and to the left of stem clamp area,
the right inner grip portion extending upwardly relative to the stem clamp axis and to the right of the stem clamp area,
the left outer grip portion connecting to the left inner grip portion at the left inner grip portion's most forward and upward point and extending to the left therefrom with a slope angle of between five and sixty degrees and a sweep angle of between four and forty-five degrees,
the right outer grip portion connecting to the right inner grip portion at the right inner grip portion's most forward and upward point, and extending to the right therefrom with a slope angle of between five and sixty degrees and a sweep angle of between five and sixty degrees,
a left drop affixed to the leftmost end of the left outer grip portion, and
a right drop affixed to the rightmost end of the right outer grip portion.

2. The bicycle handlebar of claim 1 having a slope angle of 5 to 30 degrees.

3. The bicycle handlebar of claim 1 having a slope angle in the range of 5 to 15 degrees.

4. The handlebar of claim 1 having a sweep angle in the range of 4 to 30 degrees.

5. The handlebar of claim 1 having a sweep angle in the range of 4 to 15 degrees.

6. The bicycle handlebar of claim 4 having a slope angle in the range of 5 to 30 degrees.

7. The bicycle handlebar of claim 5 having a slope angle in the range of 5 to 30 degrees.

8. The bicycle handlebar of claim 4 having a slope angle in the range of 5 to 15 degrees.

9. The bicycle handlebar of claim 5 having a slope angle in the range of 5 to 15 degrees.

10. A bicycle handlebar comprising
a stem clamp area having a stem clamp axis, the stem clamp area being fixedly disposed between symmetrical left and right grip portions wherein each of the left and right grip portions comprises an inner grip portion and an outer grip portion,
the left inner grip portion extending upwardly relative to the stem clamp axis and to the left of stem clamp area,
the right inner grip portion extending upwardly relative to the stem clamp axis and to the right of the stem clamp area, the left outer grip portion connecting to the left inner grip portion at the left inner grip portion's most forward and upward point and extending to the left therefrom with a downward slope angle and a backward sweep angle, the right outer grip portion connecting to the right inner grip portion at the right inner grip portion's most forward and upward point, and extending to the right therefrom with a downward slope angle and a backward sweep angle, a left drop affixed to the leftmost end of the left outer grip portion, and a right drop affixed to the rightmost end of the right outer grip portion.

11. The bicycle handlebar of claim 10 wherein the sweep angles of the left and right outer grip portions are in the range of 4 to 45 degrees and the slope angles of the left and right outer grip portions are in the range of 5 to 15 degrees.

12. The bicycle handlebar of claim 10 having a sweep angle in the range of 4 to 30 degrees and a slope angle in the range of 5 to 60 degrees.

13. The bicycle handlebar of claim 10 having a sweep angle in the range of 4 to 30 degrees and a slope angle in the range of 5 to 30 degrees.

14. The bicycle handlebar of claim 10 having a sweep angle in the range of 4 to 30 degrees and a slope angle in the range of 5 to 15 degrees.

15. The bicycle handlebar of claim 10 having a sweep angle in the range of 4 to 15 degrees and a slope angle in the range of 5 to 60 degrees.

16. The bicycle handlebar of claim 10 having a sweep angle in the range of 4 to 15 degrees and a slope angle in the range of 5 to 30 degrees.

17. The bicycle handlebar of claim 10 having a sweep angle in the range of 4 to 15 degrees and a slope angle in the range of 5 to 15 degrees.

18. The bicycle handlebar system of claim 1 wherein the drop angle is less than 30 degrees.

19. The bicycle handlebar system of claim 1 having a detent on each of the left and right drops and wherein the detent is longer than 100 mm and wider than 20 mm.

20. A bicycle handlebar comprising:

an integrally formed top bar having a stem clamp area disposed between a first bar and a second bar, each of the first bar and second bar comprising an inner grip portion and an outer grip portion and wherein each of the inner grip portions extends upward and forward of a stem clamp axis and each of the outer grip portions extends downward and backward, a first drop integrally affixed to the outermost point of the first bar and including upper and lower portions arranged with respect to the first bar to yield a drop angle less than 30 degrees, a second drop integrally affixed to the outermost point of the second bar and including upper and lower portions arranged with respect to the second bar to yield a drop angle less than 30 degrees, a flat palm segment in each of the first and second drops and comprising a bar grip area adjacent to each of the first and second drops, and a flat thumb index comprising a first detent in the first drop and the second drop.

\* \* \* \* \*